United States Patent [19]
Lostlen

[11] Patent Number: 5,807,036
[45] Date of Patent: Sep. 15, 1998

[54] ADJUSTABLE DRILL JIG

[76] Inventor: Tad K. Lostlen, 52256 Alta Dena Ave., Morongo Valley, Calif. 92256

[21] Appl. No.: 725,520

[22] Filed: Oct. 4, 1996

[51] Int. Cl.⁶ ..................................................... B23B 39/00
[52] U.S. Cl. ........................ 408/97; 408/115 R; 408/72 B
[58] Field of Search .......................... 408/97, 103, 115 R, 408/115 B, 72 B

[56] References Cited

U.S. PATENT DOCUMENTS

| | | | |
|---|---|---|---|
| D. 334,700 | 4/1993 | Eller | D8/71 |
| 2,497,733 | 2/1950 | Kebour | 408/115 R |
| 2,821,027 | 1/1958 | Billhimer, Sr. | 33/189 |
| 2,949,798 | 8/1960 | Berta, Jr. | 77/62 |
| 2,990,733 | 7/1961 | Garcia | 77/62 |
| 3,246,399 | 4/1966 | Southern | 33/189 |
| 3,583,823 | 6/1971 | Eaton et al. | |
| 4,137,003 | 1/1979 | Budoff | 408/115 R |
| 4,257,166 | 3/1981 | Barker et al. | 33/185 |
| 4,474,514 | 10/1984 | Jensen | 408/115 R |
| 4,579,485 | 4/1986 | Connor et al. | 408/115 R |
| 4,684,299 | 8/1987 | Laliberte | 408/115 |
| 4,952,101 | 8/1990 | Coombs | 408/115 |
| 5,064,319 | 11/1991 | Ericksen | 408/115 R |
| 5,158,406 | 10/1992 | Ulinskas | 408/115 R |
| 5,217,331 | 6/1993 | Ericksen | 408/53 |
| 5,507,607 | 4/1996 | Ericksen et al. | 408/115 R |
| 5,590,986 | 1/1997 | Juang | 408/115 R |

OTHER PUBLICATIONS

Euro Uniguide.
Euro Jig.
Euro Jig Jr.
Euro 32 Template.
Drilling Accessories #892–834.

*Primary Examiner*—Daniel W. Howell
*Assistant Examiner*—Adesh Bhargava
*Attorney, Agent, or Firm*—Palmer C. DeMeo

[57] ABSTRACT

An adjustable drill jig for precisely locating and drilling one or more holes in a workpiece such as a kitchen cabinet component (side panel, door, drawer, etc.) or the like. The adjustable drill jig is versatile in its applications and is composed of components that can be readily assembled (or disassembled) to form various modifications of the drill jig for different applications. The adjustable drill jig is composed of at least one elongated element with at least one rule on a surface thereof, at least one adjustable drill guide which has a drill bushing therein and is slidably movable along the length of the elongated element, and a stop plate attached to an element which is slidably movable along the at least one elongated element.

54 Claims, 8 Drawing Sheets

ADJUSTABLE DRILL JIG

BACKGROUND OF THE INVENTION

1. Field of the Invention

The present invention relates generally to an adjustable drill jig for precisely positioning and drilling one or more holes in a workpiece and, more particularly, for positioning and drilling holes in cabinet components, such as, drawers and doors for handles and knobs, doors for hinges, and side panels for drawer guides, hinges, shelf clips or dowels, etc.

2. Description of the Related Art

Presently, there are various tools, templates, guides and jigs on the market to locate and drill holes in cabinet drawers, doors and side panels as well as various tools, templates, guides and jigs to locate and drill holes in other work pieces. Some of these tools, templates, guides and jigs are adjustable or fixed and/or have limited use and some require the use of a measuring tape or ruler in addition thereto to set the hole pattern. There is a need in the market for a more versatile drilling device which is lightweight and capable of carrying out multiple drilling tasks such as those mentioned above and others as well. The adjustable drill jig of this invention is a device having these features as well as being capable of fulfilling multiple drilling tasks on various workpieces in the woodworking art as well as in other arts, e.g., metalworking, plasticworking, etc., where precise drilling of hole(s) is required for workpieces which are substantially flat.

U.S. Pat. No. 4,684,299 discloses a jig for locating and drilling holes in cabinet doors and drawers including rules but has a rack and pinion mechanism for positioning a pair of drill bushings. The jig disclosed therein appears to be complicated, expensive to make, and limited in use since it has only two movable drill bushings.

U.S. Pat. No. 4,952,101 discloses an apparatus for locating and drilling construction holes and holes for cabinet doors, drawers, and panels. The apparatusses disclosed in this patent are complicated in structure in that they consist of a number of rods fixed to a body and having movable stops thereon wherein the body has a plurality of drill bushings therein which are at predetermined fixed distances from each other or, in one embodiment, has only one movable drill guide with a drill bushing therein.

U.S. Pat. No. 2,990,733 discloses a drilling fixture for drilling holes for cabinet door pulls which fixture has a unitary flat body that is somewhat T-shaped and has at one end thereof two sets of fixedly spaced, drilling hole guides. However, the fixture does not have a mechanism with movable drill guide means such that the drill guide means can be adjusted relative to each other and to the edges or sides of the workpiece to accommodate drilling hole applications other than holes for cabinet door pulls.

U.S. Pat. No. Des. 334,700 discloses an ornamental design for a drill jig having what appears to be two movable drill guides adjustable along a central bar with rules thereon. However, this drill jig appears to have limited use since it has only two drill bushings, inter alia.

U.S. Pat. No. 3,583,823 discloses an adjustable drill fixture for centrally locating drawer handle holes; however, although the disclosed fixture has a rule on one portion thereof, it is a complicated structure comprising wheels (sprocketed and unsprocketed), belts and a spring mechanism for adjusting slidable movable blocks, each having a drill guide aperture therein.

Other prior art U. S. patents which appear to be of less relevance are: U.S. Pat. No. 4,579,485; U.S. Pat. No. 4,257,166; U.S. Pat. No. 2,949,798; U.S. Pat. No. 2,821,027; and U.S. 3,246,399.

Each of the Euro references AA, BB, and CC discloses a tool that can be used to position and drill holes for drawer guides or hinges; however, none of these tools appears to have a rule associated therewith. Furthermore, the adjustable element for positioning the holes, unlike the present invention, is different for each tool.

The Euro reference DD discloses a drill template for positioning a plurality of shelf holes; unlike the present invention, it does not have adjustable drill guide(s) or a rule associated therewith.

The Drilling Accessories reference EE discloses a drill jig which has two bushings that are adjustable by a thumb gear for handles and a fixed third bushing for drilling a hole for a single knob.

SUMMARY OF THE INVENTION

The present invention is directed to an adjustable drill jig that is capable of performing a variety of drilling operations where a precise location of one or more holes is required for a work piece. The drill jig of this invention, in one embodiment, is a substantially T-shaped, flat structure with measurement means or rules on each of the stem and cross-bar portions of the T-shaped structure and with movable guide means on the T-stem portion and both sides of the T-cross-bar portion whereby the drill jig can be easily and readily positioned relative to a work piece in order to drill one or more holes at precise locations on the work piece such as, for example, a cabinet door, drawer or side panel. Each of the movable guide means has a drill bushing therein and there is a single, fixed, drill bushing located near one end of the stem portion of the T-shaped structure such that an imaginary straight line passing through the centers of each of the drill bushings in the movable guides on both sides of the cross-bar portion and in the drill bushing in the stem portion is parallel to the elongated cross-bar portion. The adjustable drill jig of this invention can have a plurality of movable guide means on each side of the cross-bar portion where more than three holes are required for a particular application, e.g, a plurality of holes for shelf clips or dowels in a cabinet side panel. Due to the unique T-shaped configuration of the adjustable drill jig of this invention, a worker or craftsman can readily position the jig on the work piece to accommodate the location and drilling of one or more holes on either the left or right hand side of the workpiece at any corner location on the face of the work piece or along any location on the face of the work-piece. In another embodiment of this invention for locating and drilling system holes, for example, the adjustable drill jig is composed of an elongated cross-bar member having a measurement means or rules on one side thereof, two stem members each being attached perpendicularly to proximate opposite ends of the cross-bar member and each having measurement means or rules on one side thereof, and moveable guide means on both the cross-bar and stem members wherein each of the moveable guide means on the cross-bar member has a drill bushing therein. In yet another embodiment of this invention for locating holes on and drilling holes in both the left side and right side of a cabinet panel, for example, the adjustable drill jig is composed of an elongated member having a measurement means or rules on one side thereof, a moveable guide with a stop plate attached thereto, and one or more moveable drill guides thereon, each having a drill bushing therein. It is also intended that the components of the several embodiments of this invention are interchangeable with each other or can be used in the assembly of one or more of the several embodiments disclosed herein.

Thus, it is a primary object of this invention to provide an adjustable drill jig that is versatile and readily adaptable to a variety of drilling applications on a work piece where a precise location or locations of a hole or holes is or are required.

It is another object of this invention to provide an adjustable drill jig that will position and drill one or more holes in a work piece with precision and accuracy time after time.

It is a further object of this invention to provide an adjustable drill jig that is particularly usefull in positioning and drilling holes in cabinet components such as doors, drawers and side panels.

It is yet another object of this invention to provide an adjustable drill jig that does not require the use of a measuring tape or ruler for many of its applications for positioning and drilling holes in a work piece.

It is still another object of this invention to assemble the several embodiments of this invention with components that are common to each other or are interchangeable with each other.

DESCRIPTION OF THE PREFERRED EMBODIMENTS

Figure 1:
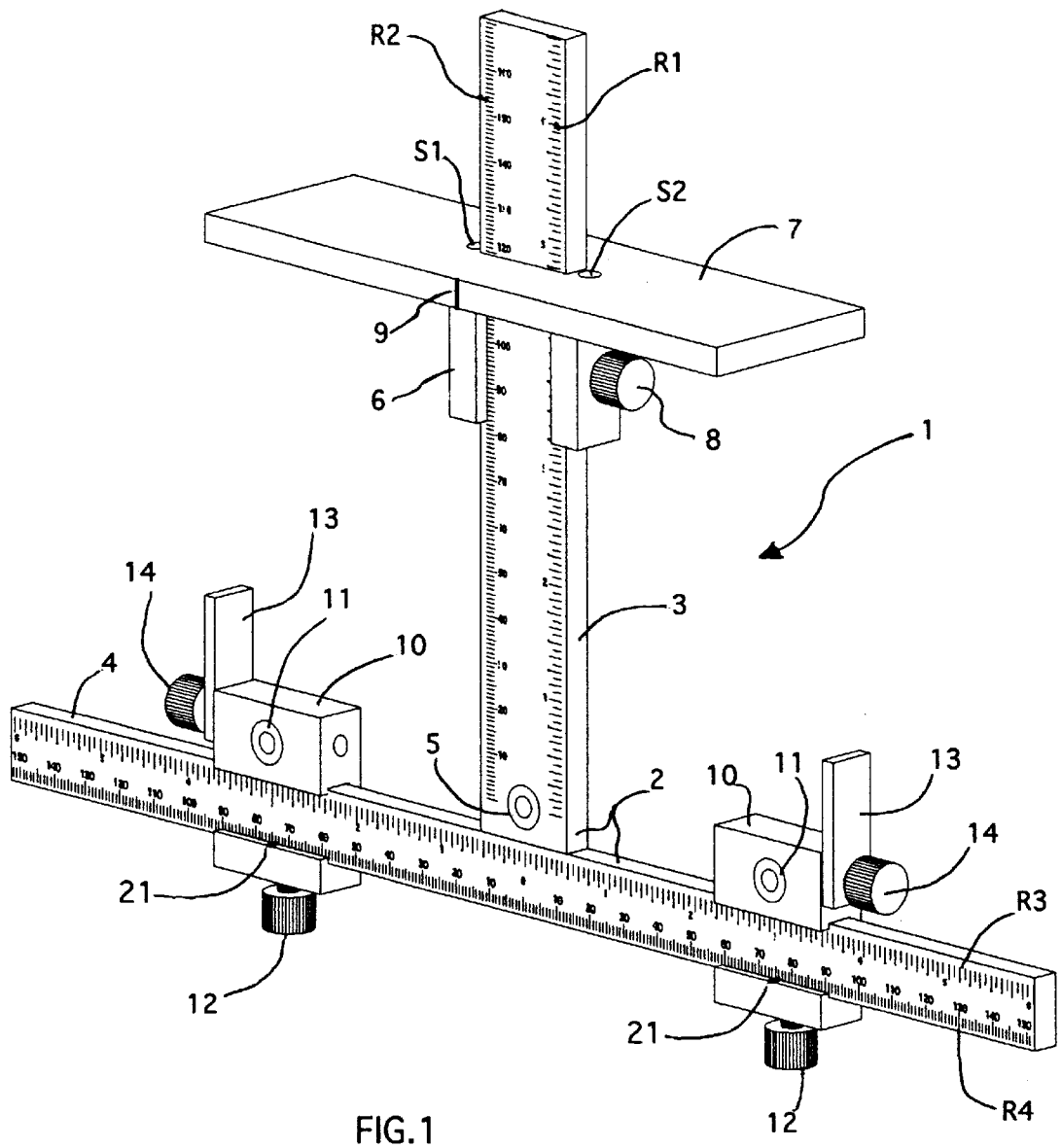
FIG. 1 is a perspective elevational view of a first embodiment of the adjustable drill jig of this invention.
Figure 1A:
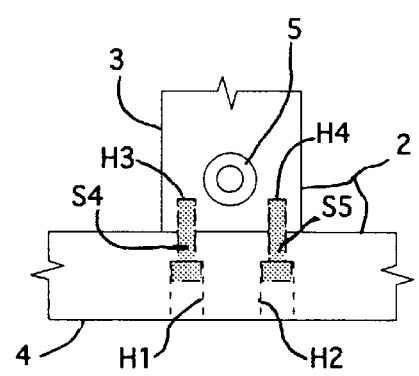
FIG. 1a is a blown up view of section 2 in FIG. 1 illustrating a method of attaching the stem portion to the base portion.

Referring now to FIGS. 1 and 1a, there is shown a first embodiment of the adjustable drill jig 1 of this invention wherein the jig comprises a substantially flat T-shaped element 2 having a stem portion 3 and a cross-bar portion 4 perpendicular thereto. The portions 3 and 4 may be permanently fixed to each other by being cast as one unit or welded to each other but preferably they are attached to each other by screws S4 and S5 as shown in FIG. 1a so that the portions 3 and 4 can be separated and used individually in other embodiments of this invention which will be explained later. The screws S4 and S5 fit into recessed holes H1 and H2, respectively, in the cross-bar portion 4 and threaded into threaded holes H3 and H4, respectively, in the stem portion 3. Although, in this preferred embodiment, the portions 3 and 4 of the T-shaped element 2 are substantially flat, it is also possible to construct the two portions with other elongated geometrical shapes or configurations such as elongated rods having a circular cross section, a square crosssection, etc. The T-shaped element 2 is preferably constructed from anodized aluminum but may be constructed from aluminum, other metallic materials, or other durable materials such as hard plastic or wood. As shown in FIG. 1, the stem portion 3 has rules R1, R2 on opposite longitudinal sides thereof, a rule R1 in U.S. units (inches) on the right hand side and a rule R2 in metric units (millimeters) on the left hand side. The cross-bar portion 4 also has rules R3, R4 on opposite longitudinal sides thereof with a rule R3 in U.S. units on the top side thereof and a rule R4 in metric units on the bottom side thereof. All the rules may be put on the T-shaped element by a silk-screening process, an impression stamping process, or any other well known application process. The stem portion 3 of the drill jig 1 has a center drill bushing 5 at the lower end thereof. The "0" point or mark of the two rules R3, R4 on the stem portion 3 is located near the intersection 2 of the stem and cross-bar portions as shown in FIG. 1. The drill bushing 5 is positioned at the "0" point of the two rules on the stem portion 3. The drill bushing 5 is preferably made from steel but may be made from other metallic materials or hard and durable materials. The drill bushing 5 has an inner diameter to accomodate a drill size for drilling a desired hole or holes in a work piece for a particular application. The drill bushing 5 may be force fitted into an opening in the stem portion 3 or may be externally threaded and screwed into a threaded hole in the stem portion 3 or may be attached to the stem portion 3 by any other suitable means. Different bushings 5 having different size inner diameters may be used depending on the desired or required hole sizes for particular applications. On the stem portion 3 of the adjustable drill jig 1, there is a movable guide 6 which is slidably movable up and down the stem portion 3. Fixed on the upper side of the guide 6 is a stop plate 7 which is used to position the drill jig 1 on one edge or side of a work piece such as a cabinet door, drawer or side panel. The bottom side of this stop plate 7 is used as one reference plane in setting the distance or spacing from the edge of a workpiece to the drill bushing 5 in the direction of the stem portion 3. This stop plate 7 may be centrally fixed to the top of the movable guide 6 by screws S1, S2 or by other appropriate attachment means. A thumb screw 8 passes through a threaded hole in the side of the movable guide 6 in order that the guide 6 can be fixed at a desired location along the stem portion 3 of the adjustable drill jig 1. On the right hand side of the cross-bar portion 4 of the drill jig 1, there is a movable drill guide 10 which is slidably movable along that side. The movable drill guide 10 has a drill bushing 11 in the upper part thereof. The drill bushing 11 is similar to drill bushing 5 in the stem portion 3 except that it is thicker in depth in order to accommodate the thickness of the drill guide 10. The drill guide 10 is slidably movable along the right hand side of the cross-bar portion 4 of the drill jig 1. A thumb screw 12 is threaded into a threaded hole in the bottom part of the movable drill guide 10 in order that the drill guide 10 can be fixed at a desired position along the right hand side of the cross-bar portion 4. Attached to the right hand side of the drill guide 10 is a flip stop element 13 which can be rotatably moved into engagement with an edge or side of a workpiece for a particular application. This flip stop element 13 is used as another reference plane in setting the distance or spacing from the edge of the workpiece to the drill bushing 5 in the direction of the cross-bar portion 4. A thumb screw 14 is used to lock this flip stop element 13 in either an operative position or an inoperative position. On the left hand side of the cross-bar portion 4 of the drill jig 1, there is another movable drill guide 10 similar in structure and operation as the drill guide 10 on the right hand side of the cross-bar portion 4 except that the flip stop element 13 is attached to the left hand side of the drill guide. The width of the cross-bar portion 4 may be less than the width of the stem portion 3 since it does not have to accommodate a drill bushing for size and support as does the stem portion 3. The preferred dimensions of the T-shaped element 2 are approximately 6 and ½ inches for the stem portion 3 and 12 inches for the cross-bar portion 4 with a thickness for both portions of about ¼ inch. However, these dimensions are for an adjustable drill jig that is particularly adaptable for use in positioning and drilling holes for cabinetry work. The adjustable drill jig of this invention may have larger or smaller dimensions depending on the size of the work piece that a craftsman is accustomed to work on.

Figure 2:
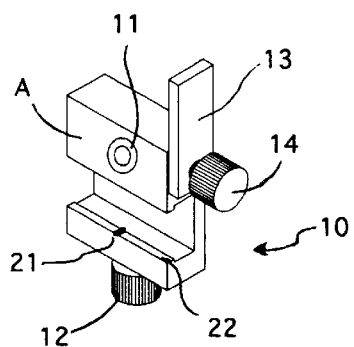
FIG. 2 is a perspective elevational view of the movable drill guide used on the horizontal portion of the adjustable drill jig of this invention.
Figure 2A:
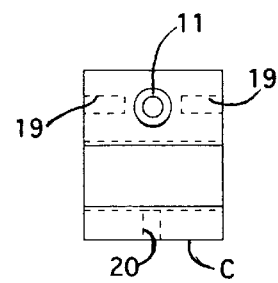
FIG. 2a is a front elevational view of the movable drill guide shown in FIG. 2.
Figures 2B, 2C:
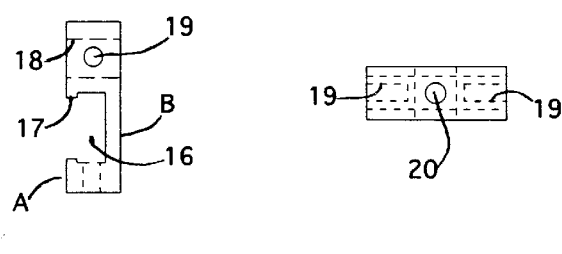
FIG. 2b is a side elevational view of the movable drill guide shown in FIG. 2.
FIG. 2c is a bottom view of the movable drill guide shown in FIG. 2.
Figure 2D:
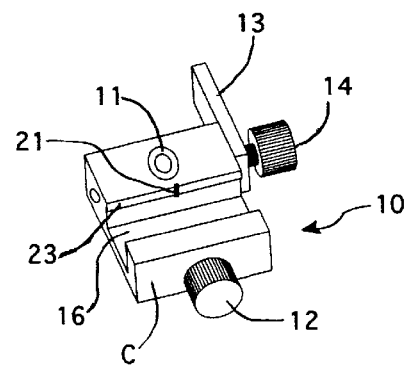
FIG. 2d is another perspective view of the movable drill guide shown in FIG. 2.
Figure 3:
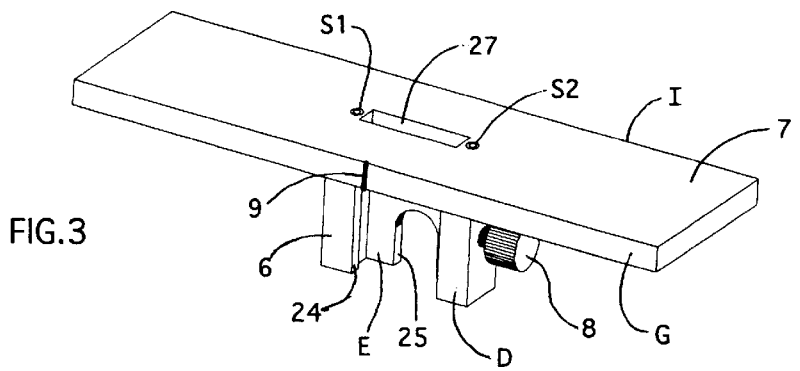
FIG. 3 is a perspective elevational view of the movable guide and stop means used on the vertical portion of the adjustable drill jig of this invention.
Figure 3A:
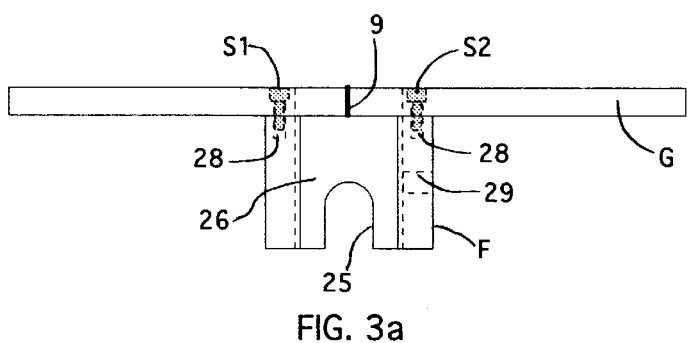
FIG. 3a is a front elevational view of the movable guide shown in FIG. 3.
Figure 3B:
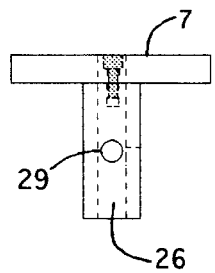
FIG. 3b is a side elevational view of the movable guide shown in FIG. 3.
Figure 3C:
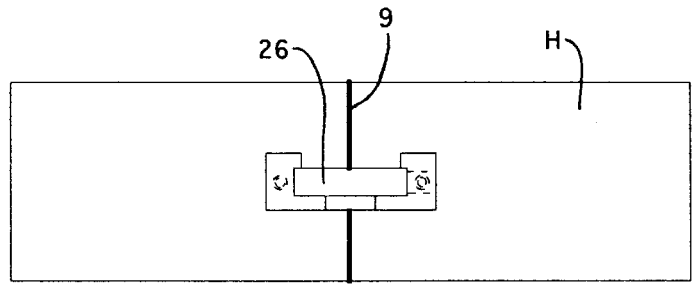
FIG. 3c is a bottom plan view of the movable guide shown in FIG. 3.

Referring now to FIGS. 2, 2a, 2b, 2c, and 2d, there is shown a movable drill guide 10 which can be used on either the left hand side or the right hand side of the cross-bar portion 4. The drill guide 10 is constructed from a single piece which may be made from the same material as the T-shaped element 2. The drill guide 10 has a cavity 16 therein which fits over the cross-bar portion 4 and allows it to be slidably movable along the length of the cross-bar portion 4 up to an edge of the stem portion 3 and a front opening 17 such that the rules thereon are viewable to the workman or the craftsman. The drill bushing 11 fits into a hole 18 which extends from the front face A of the drill guide 10 to the rear face B of the drill guide 10. The drill bushing 11 extends through the length of the hole 18. On both the left hand and right hand sides of the drill guide 10, there is a threaded hole 19 for receiving a thumb screw 14 which locks or fixes a stop means 13 to either the left hand side or right hand side of the movable drill guide 10 depending on which side of the cross-bar portion 4 the drill guide 10 is used or to get closer to the drill bushing 5 for a particular application. A threaded hole 20 extends through the bottom face C of the drill guide 10 up to the cavity 16 in order to receive a thumb screw 12 to lock or fix the movable drill guide 10 at a desired location along the cross-bar portion 4. A pair of index or reference marks 21 (in line with the center of drill bushing 11) are located opposite each other on the drill guide 10 at the center of each edge 22 and 23, respectfully, adjacent the opening 17 of the drill guide 10. One index or reference mark 21 is shown in FIG. 2 on the bottom edge 22 of the movable drill guide 10 and another index or reference mark 21 is shown in FIG. 2d on the top edge 23 of the movable drill guide 10. The index or reference marks 21 can, for examples, be V-shaped grooves or silk screened on the respective drill guide edges 22 and 23. The approximate dimensions of the movable drill guide 10 are 1 and ¼ inches wide, 1 and ½ inches high, and ½ inch in depth; these dimensions are for a preferred embodiment of the drill jig used for cabinetry work but may vary, as was mentioned before, for other structures or workpieces having conventionally smaller or larger dimensions than those generally found for cabinetry work.

Referring to FIGS. 3, 3a and 3b, and 3c, there is shown the movable guide 6 with an attached stop plate 7, the movable guide 6 being used on the stem portion 3. The movable guide 6 has an opening 24 in the front face D thereof, a rear face E with a cutout 25 therein to allow the drill bit to pass therethrough to the workpiece when the movable guide 6 and stop plate 7 unit is in its lowermost position (as shown, for example, in FIG. 5 of the drawing), and a cavity 26 therein between the front face D and the rear face E to allow the guide 6 to be slidably movable on the stem portion 3 of the drill jig 1. A stop plate 7 is attached to the top of the movable guide 6 by screws S1,S2 which are screwed into threaded holes 28 in the top of the movable guide 6 or may be attached to the movable guide 6 by any other appropriate means. The stop plate 7 has a slot 27 therein to allow it to be slidably movable on the stem portion 3 together with the movable guide 6 to which it is attached. A thumb screw 8 is screwed into a threaded hole 29 which penetrates through side F of the movable guide 6 so that the guide 6 can be fixed or locked to the stem portion 3 at a desired location thereon. On the front edge G, on the underside H, and on the back edge I of the stop plate 7, there is a continuous index or reference mark 9 which is in line with the center of fixed drill bushing 5. This index or reference mark 9 can, for examples, be a V-shaped groove or silk screened on the stop plate 7. This index or reference mark 9 on the stop plate 7 is used in applications of the drill jig 1 whenever a a ruler or measuring tape is required to position the drill jig 1 along the edge of the workpiece (for example, see the FIG. 7 application). The relative dimensions of the stop plate 7 for the T-shaped adjustable drill jig 1 are 6 inches long, 1 and ¼ inches in depth, and ¼ inch thick. These dimensions may vary for larger or smaller overall dimensions for the FIG. 1 embodiment of this invention.

Figure 4A:
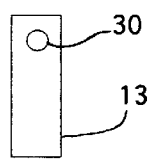
FIGS. 4a, 4b, and 4c are top plan views of different forms of the flip stop shown in FIG. 1.
Figure 4B:
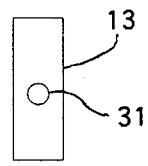
Figure 4C:
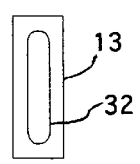

Referring to FIGS. 4a, 4b, and 4c, there are shown three different forms that the flip stop 13 can take. FIG. 4a shows a first form wherein the flip stop 13 is a substantially rectangular plate having an aperture 30 in one end thereof. In this form the flip stop 13 can be rotated into an operative or inoperative position about the thumb screw 14 (shown in FIG. 1). FIG. 4b shows a second form wherein the flip stop 13 has an aperture 31 in its center and is fixed to the movable drill guide 10 (shown in FIG. 1) by thumb screw 14. In this form the flip stop 13 extends beyond the front and back sides of the movable drill guide 10 so that it can engage the workpiece for alinement regardless of the orientation of the drill jig relative to the workpiece. FIG. 4c shows a third form wherein the flip stop 13 has an elongated slot 32 therein. In this form the flip stop 13 can be positioned relative to the thumb screw 14 and perform in the same manner as the flip stop 13 in either FIG. 4a or FIG. 4b or the flip stop 13 can be moved laterally with respect to the thumb screw 14 and the side of the movable drill guide 10 so as to extend beyond either the front side or the back side of the movable drill guide 10 so that it can engage the workpiece for alinement regardless of the orientation of the drill jig relative to the work piece.

Figure 5:
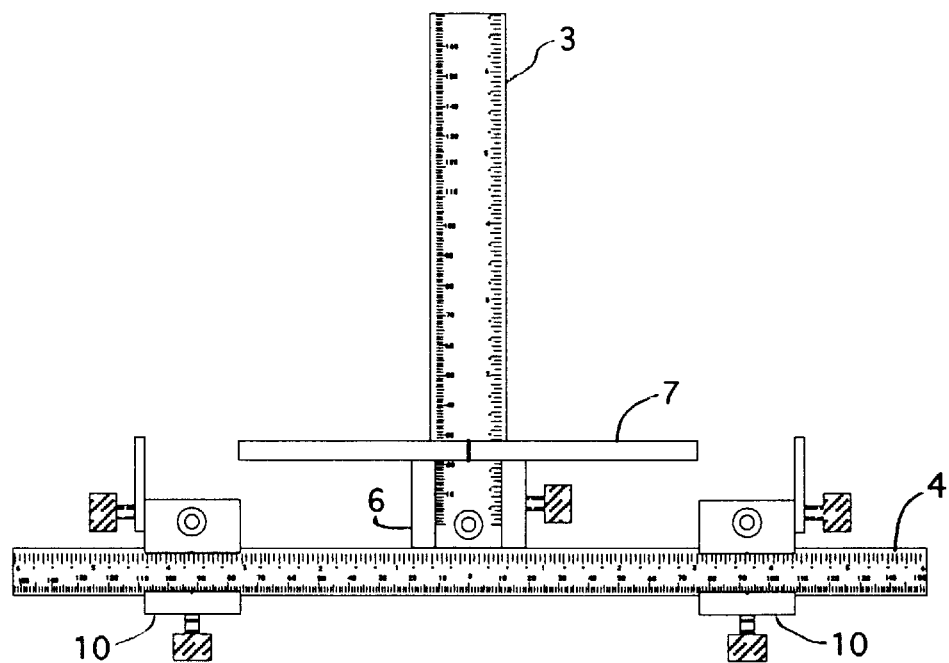
FIG. 5 is a front elevational view of the adjustable drill jig shown in FIG. 1 with the stop plate in an upper position.
Figure 6:
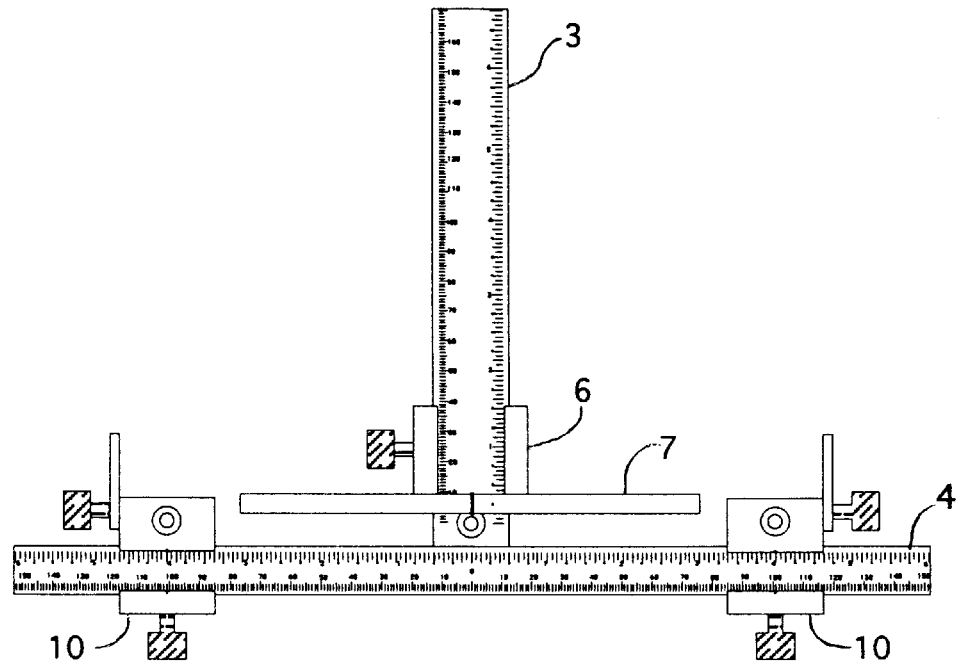
FIG. 6 is another elevational view of the adjustable drill jig shown in FIG. 1 with the stop plate in a lower or inverted position.

FIG. 5 shows the adjustable drill jig 1 of the first embodiment of this invention with the stop plate 7 in an upper position. However, if it is desired or required to locate and drill a hole or holes closer to an edge or side of a workpiece then the stop plate 7 is inverted by inverting the drill guide 6 and stop plate 7 unit on the stem portion 3 so that the stop plate 7 is in a lower position closer to the cross-bar portion 4 such as shown in FIG. 6. In this inverted position, the bottom side of the stop plate 7 becomes the reference plane.

As is well known in this art, the drill jig of this invention, as well as the modifications thereof disclosed herein, is manually held against the workpiece during the application thereof, i.e., during the actual drilling of the hole or holes in the workpiece.

Some practical applications of the first embodiment of the adjustable, T-shaped, drill jig 1 of this invention will now be described in the following examples:

EXAMPLE 1

Figure 7:
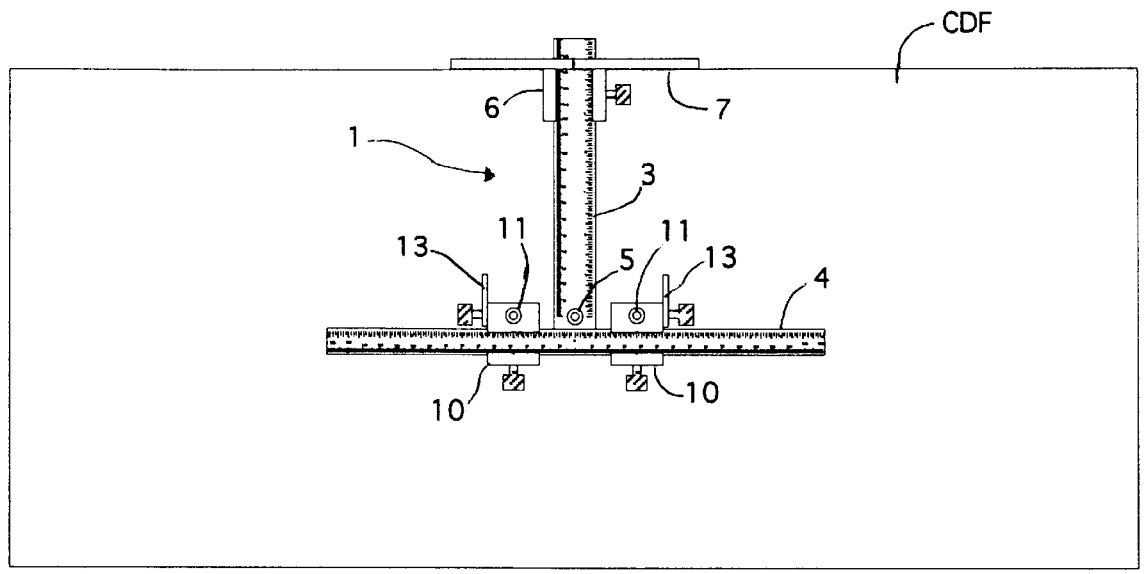
FIG. 7 shows one application of the adjustable drill jig of FIG. 1 to a cabinet drawer front.

FIG. 7 shows the adjustable drill jig 1 being used on a cabinet drawer front CDF. To drill a single hole for a knob on the drawer front, the movable plate 7 on the movable guide 6 on the stem portion 3 of the jig 1 is adjusted and fixed such that the drill bushing 5 therein is set at a desired distance from the top of the drawer front CDF. The jig 1 is then centered (using a ruler or measuring tape) and held on the drawer front CDF, a hole of the proper diameter, e.g., 5 mm., is then drilled through the drawer front CDF using the center drill bushing 5 in the stem portion 3. To drill two holes for a handle in the drawer front CDF, each of the movable drill guides 10, 10 is set at one and a half inches from the center or "0" point on the cross-bar portion 4. The jig 1 is then centered and positioned on the drawer front CDF as in the previous case and the two holes are then drilled through the drawer front CDF using each of the side drill bushings 11, 11 making the spacing between the two holes 3 inches apart which is conventional for cabinet drawer handles. In this application the flip stops 13, 13 are not used.

EXAMPLE 2

Figure 8:
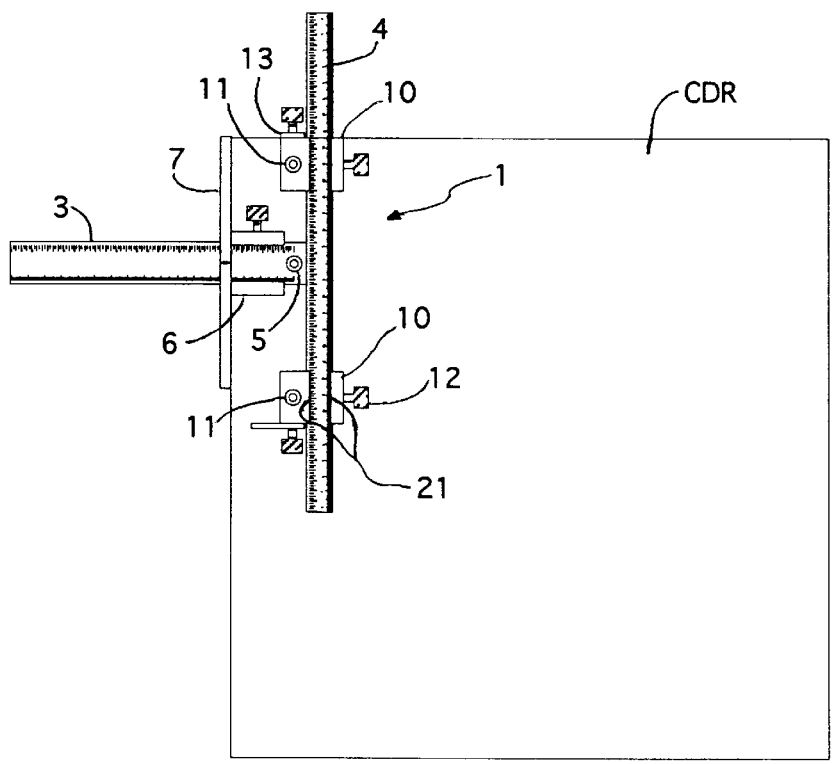
FIG. 8 shows another application of the adjustable drill jig of FIG. 1 to a cabinet door.

FIG. 8 shows the adjustable drill jig 1 being used on a cabinet door CDR. To drill a hole for a knob on the cabinet door CDR, set the flip stop 13 in a forward position so that it will engage the top edge of the cabinet door CDR. In this application, both the flip stop 13 and stop plate 7 act as reference planes. An advantage of combining the flip stop 13 with an adjustable drill guide 10 eliminates the need for an independent stop to reference an edge of a workpiece. Move and fix the movable guides 10 and 6 at the desired locations, using the stop plate 7 and the upper flip stop 13 as the reference planes in order to position the fixed drill bushing 5 at the position where it is desired to locate the hole for the knob. The adjustable drill jig 1 is then positioned and held at one corner of the cabinet door CDR as shown in FIG. 8 of the drawing and a hole is drilled into the cabinet door via the drill bushing 5 in the stem portion 3. To drill a pair of holes for a handle or pull for the cabinet door CDR, use the center or fixed drill bushing 5 for one hole and the drill bushing 11 in the lower, movable drill guide 10 for the second hole. Preset the position of the center or fixed drill bushing 5 at the location where it is desired to locate the upper hole for the handle and move or adjust the lower movable guide 10 (using the index or reference marks 21 on the lower guide 10) a desired distance, e.g., 3 inches or 4 inches, as the case may be, from the center bushing 5 and fix the lower movable guide 10 to the cross-bar portion 4 using the thumb screw 12 therein. Then position and hold drill jig 1 at the upper left hand corner of the cabinet door CDR as shown in FIG. 8 and drill holes therein using the center drill bushing 5 and drill bushing 11 in the lower drill guide 10.

EXAMPLE 3

Figures 9, 10:
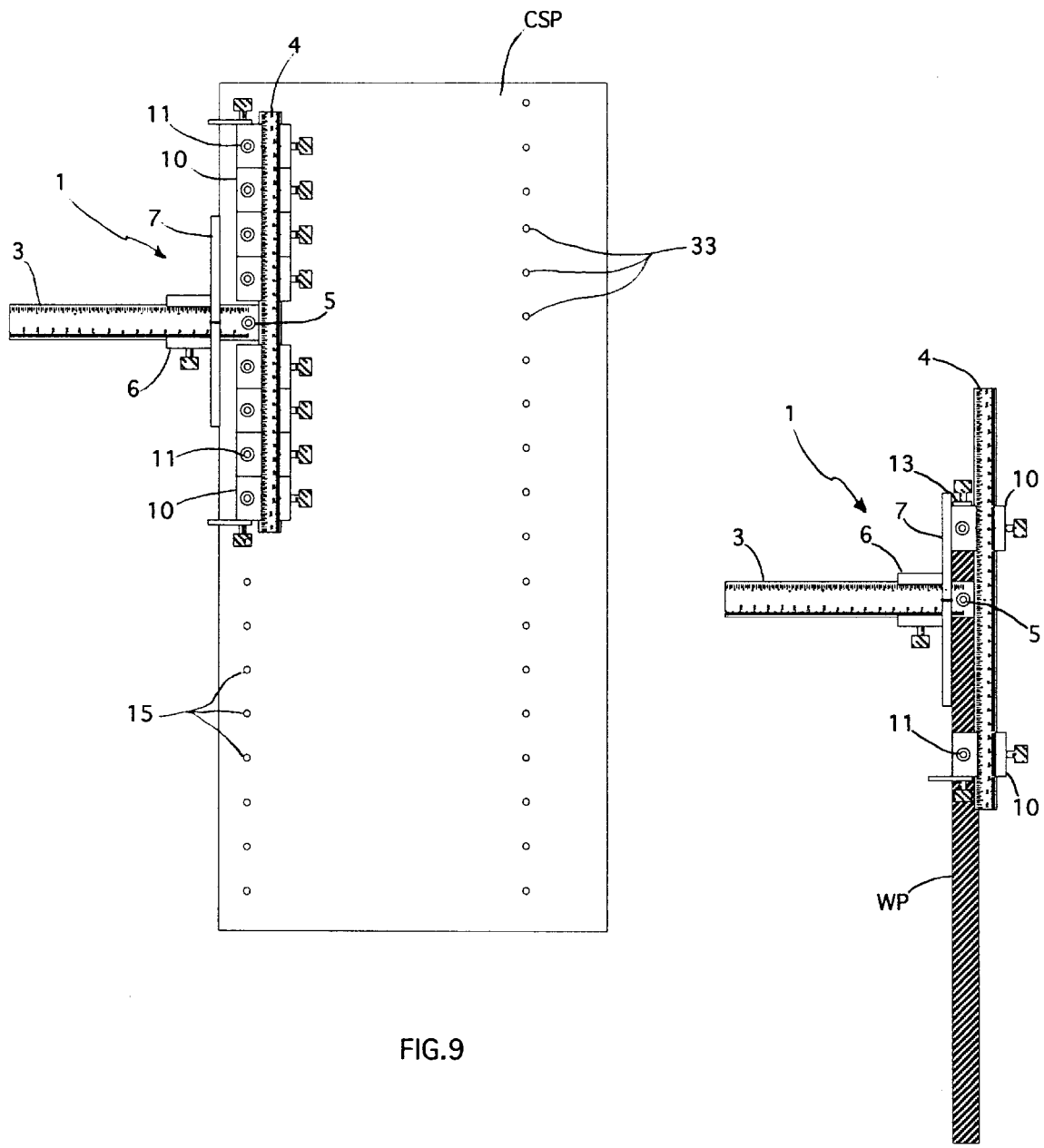
FIG. 9 shows a third application of the adjustable drill jig of FIG. 1 to a cabinet side panel.
FIG. 10 shows a fourth application of the adjustable drill jig of FIG. 1 to a cabinet door.

FIG. 9 shows the adjustable drill jig 1 being used on a cabinet side panel CSP. To drill a system of holes 15 in a cabinet side panel CSP for pins or dowels to support adjustable shelves, a plurality of movable drill guides 10 are used on both sides of the cross-bar portion 4 (up to four drill guides 10 can be accommodated on each side of the cross-bar 4 ) of the T-shaped drill jig 1. Thus, nine evenly spaced holes can be drilled along the left hand side of the cabinet side panel CSP at a first positioning of the drill jig 1, the ninth hole is obtained through the center bushing 5 in the stem portion 3. Using the stop plate 7 as a reference plane and rule on the stem portion 3, the movable guide 6 is moved on the stem portion 3 such that the drill bushing 5 (and consequently, the drill bushings 11 in the eight movable drill guides 10 on the cross-bar portion 4) is positioned at a desired distance from the left hand edge of the cabinet side panel CSP. The T-shaped drill jig 1 is then positioned and held near the upper left hand corner of the cabinet side panel CSP as shown in FIG. 9 and nine holes 15 are subsequently drilled. After the first set of holes 15 are drilled in the upper left hand portion of the cabinet side panel CSP, the drill jig 1 is repositioned below the first set of nine drilled holes 15 in order to locate and drill a second set of holes 15 or a continuation of holes 15 from the first set of holes. This is done by inserting a pin in the lowermost drilled hole 15 and positioning the uppermost drill bushing 11 of the drill jig 1 therethrough such that the rest of the drill bushings 11 (including the fixed drill bushing 5) are in alinement with the first set of drilled holes 15. Now, a second set of holes (eight in number) can be drilled in the cabinet side panel CSP. The preceding procedure is repeated if needed or until the desired number of holes is obtained. Another system of holes 33 can also be drilled on the right hand side of the cabinet side panel CSP by positioning the drill jig 1 near the opposite edge of the cabinet side panel CSP. This can be done by flipping drill jig 1 over 180 degrees so that the rules of jig 1 are facing the front surface of the cabinet side panel CSP. The drill jig 1 is then positioned at the same distance (as was used on the left hand side of the CSP) from the top right hand edge of the cabinet side panel CSP and at a desired distance from the side right hand edge of the cabinet side panel CSP using the stop plate 7 as a reference. Clearly, less than eight drill guides 10 are used when the spacing between adjacent holes are greater. The above technique for locating and drilling a system of holes using this modification of the adjustable drill jig 1 of this invention can also be used for adjustable shelves of bookcases as well as other structures requiring adjustable shelves.

EXAMPLE 4

FIG. 10 shows the adjustable drill jig 1 of this invention being used on a board-like workpiece WP, for example, a cabinet door. In this application, it is desired to locate and drill spaced holes into the end or edge of a board for insertion therein of dowels or pins, for example, for the purpose of ganging cabinet doors together. Other examples for this application would be for the assembly of other cabinet components. Using as a reference plane the flip stop 13 of the adjustable drill guide 10 on the upper end of the cross-bar 4, the drill guide 10 is positioned along the cross-bar 4 such that there is a desired distance between the reference plane of the flip stop 13 and the fixed drill bushing 5 where a first hole is desired. The adjustable drill guide 10 on the lower end of the T-shaped drill jig 1 is then moved to a predetermined location along the length of the cross-bar portion 4 where a second hole is desired. The stop plate 7 (in an inverted position from that shown in FIG. 1) is adjusted on the stem portion 3 to locate the drill bushing 5 as well as the drill bushings 11 in the respective movable drill guides 10, 10 at approximately ½ the thickness of the workpiece WP where the holes are desired. The T-shaped adjustable drill jig 1 is then positioned and held on the workpiece WP as shown in FIG. 10 with the stop plate 7 inverted and in contact with one face of the workpiece WP. Note that, in this particular example, two reference planes are used, one being provided by the stop plate 7 and the other being provided by the flip stop element 13 on the drill guide 10 at the upper end of the cross-bar portion 4.

Figure 11:
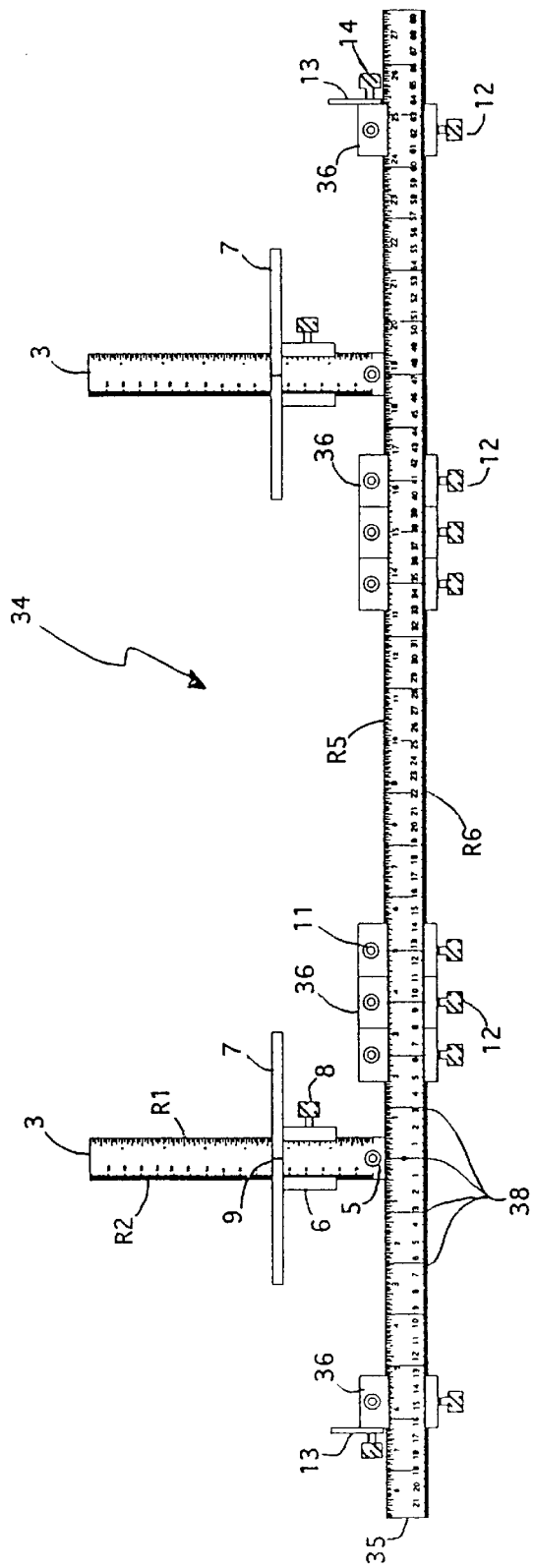
FIG. 11 is a front elevational view of another embodiment of the adjustable drill jig of this invention.

Referring now to FIG. 11, there is shown a second embodiment of the adjustable drill jig of this invention wherein the jig 34 comprises a cross-bar section 35 and two spaced stem sections 3, 3 attached perpendicularly to and near opposite ends of the cross-bar section 35. Each of the stem sections 3, 3 may be attached to the cross-bar section 35 by screws (not shown) in a manner similar to that shown in FIG. 1a. The cross-bar section 35 is 30–36 inches long but may be longer or shorter depending on the particular woodworking application. In this embodiment, the crossbar 35 is ¼ inch thick and has the same width as the vertical section 3. The cross-bar 35 has a plurality of adjustable drill guides 36 which are slidably movable along certain portions of the cross-bar 35. In this particular case, the cross-bar 35 has eight adjustable drill guides 36 along the length thereof. However, the cross-bar 35 may have more or less adjustable drill guides 36 depending on the particular application of the adjustable drill jig 34. In order to add or remove adjustable drill guides 36 from between the two stem sections 3, 3, it would be necessary to remove one of the stem sections 3, 3 from the cross-bar 35 and then reattach the stem section. The adjustable drill guides 36 are similar in structure to those for the first embodiment of the adjustable drill jig shown in FIG. 1 except that each has a height (overall and cavity) which is slightly larger to accommodate the wider width of the cross-bar 35. Each of the adjustable drill guides 36 has a drill bushing 11 similar to that used in the first embodiment of the adjustable drill jig shown in FIG. 1. Each of the stem sections 3, 3 has a movable guide 6 and a stop plate 7 as in the first embodiment. As in the first embodiment of this invention, there is a fixed drill bushing 5 in each of the stem sections 3, 3; each drill bushing 5 being located near the intersection of each stem section 3 and cross-bar section 35. The physical locations of the drill bushings 11, 5 in the movable guides 36 and in the stem sections 3 are such that an imaginary line passing through the centers of each forms a straight line which is parallel to the cross-bar section 35. There are two rules R1, R2 on the front surface of each of the stem sections 3, 3 one rule (R1) in U.S. units (inches) and another (R2) in metric units (millimeters) similar to those on the front surface of the stem section 3 in the first embodiment. As a matter of fact, each of the stem sections 3, 3 in the second embodiment may be physically identical to the stem section 3 in the first embodiment. The fixed drill bushing 5 in each of the stem sections 3, 3 is located at the "0" point of the two rules on the front surface of the respective stem section 3. There are also two rules R5, R6 on the front surface of the cross-bar section 35, one rule R5 in U.S. units (inches) located along the upper edge of the cross-bar section 35 and another rule R6 in metric units (millimeters) along the lower edge of the cross-bar section 35. There is a "0" marking for the two rules R5, R6 and this "0" marking is located on the left hand side of the cross-bar section 35 at about one quarter the length thereof and is alined with the "0" marking on the stem section 3 at the left hand side of the drill jig 34. It can be seen in FIG. 11 that each rule increases in value from each side of the "0" marking. There are also markings 38 on the cross-bar section 35 at 32 mm. intervals which spacings are conventional for making system holes used for shelves, hinge plates and drawer guides.

Figure 12:
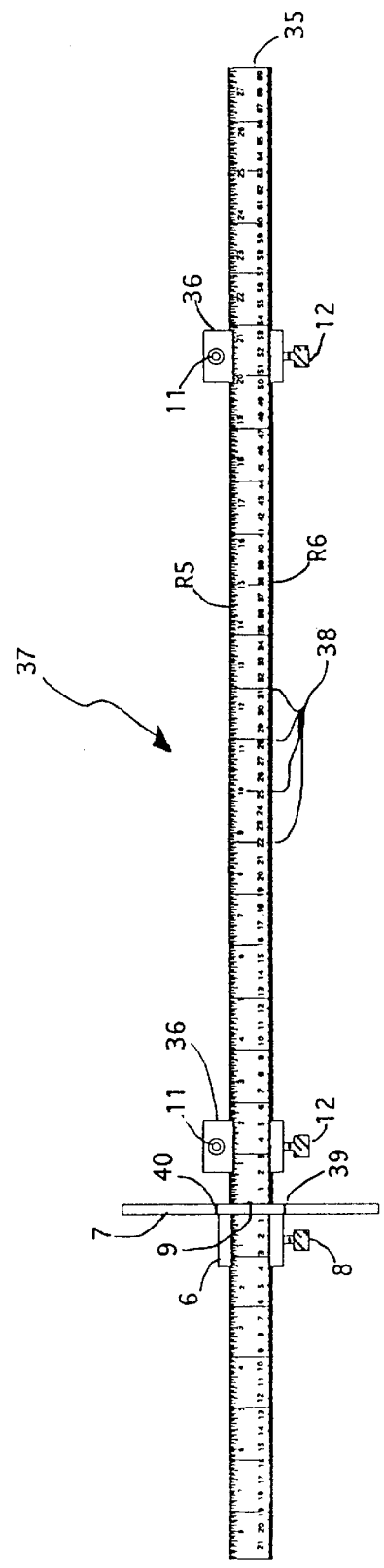
FIG. 12 is front elevational view of yet another embodiment of the adjustable drill jig of this invention.

Referring now to FIG. 12, there is shown a third embodiment of the adjustable drill jig of this invention wherein the drill jig 37 comprises a single elongated bar 35, a stop plate 7 attached to a movable guide 6 which is slidably movable along the length of the elongated bar 35, and a pair of adjustable drill guides 36, 36 which are slidably movable along the length of the elongated bar 35. As a matter of fact, this embodiment of the drill jig 37 may be made up from the components that make up the second embodiment by simply removing both of the stem sections 3, 3 from the cross-bar section 35 of the drill jig 34 shown in FIG. 11 and sliding one stop plate-movable guide unit (elements 7 and 6) onto one end of the cross-bar section 35 and a pair of adjustable drill guides 36, 36 onto the opposite end of the cross-bar section 35. Obviously, the adjustable drill guides 36, 36 and stop plate-movable guide unit (elements 7 and 6) can be slidably put on the elongated bar 35 in a different order of sequence from either the left or right end of the elongated bar 35. Each of the adjustable drill guides 36, 36 used in this third embodiment is similar in structure to the adjustable drill guides 36, 36 used in the second embodiment shown in FIG. 11. Furthermore, more than two adjustable drill guides 36, 36 may be used depending on the particular application for which the adjustable drill jig 37 is used. The stop plate 7 in the third embodiment of the drill jig 37 may have two additional indices or reference marks 39 and 40 on opposite sides of the index or reference mark 9. Depending on which side of the elongated bar 35 the drill guide(s) 36 is oriented, one of the indices 39 or 40 will be in alinement with the center(s) of the drill bushing(s) 11. Thus, the additional indices or reference marks 39 and 40 compensate for the offset of the drill bushing(s) 11 when the drill jig 37 is positioned along an edge of a workpiece.

EXAMPLE 5

Figure 13:
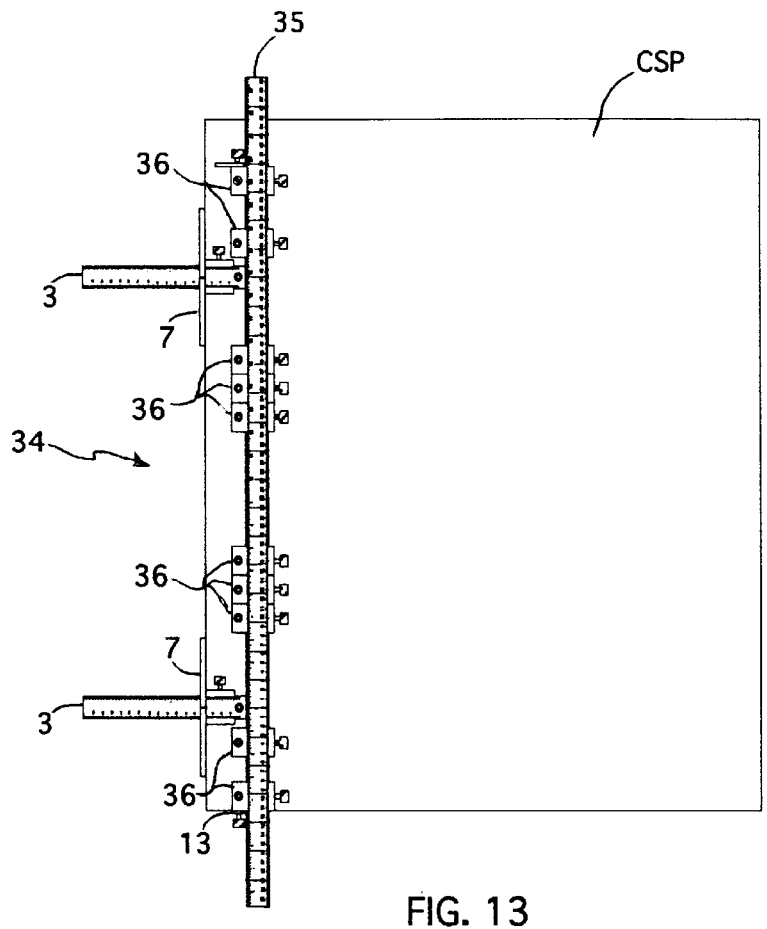
FIG. 13 shows an application of the adjustable drill jig of FIG. 11 to a cabinet side panel.

FIG. 13 shows the adjustable drill jig 34 of FIG. 11 being used on a cabinet side panel CSP to locate and drill a system of holes therein for a drawer guide, upper and lower concealed hinges and adjustable shelf clips. The adjustable drill jig 34 shown in FIG. 11 has been modified by the addition of two adjustable drill guides 36 to the cross-bar section 35 in order to effect the intended task. Note that one additional adjustable drill guide 36 has been added to the upper end as well as the lower end of the cross-bar section 35. As shown in FIG. 13, the adjustable drill jig 35 is positioned along the left side edge of the cabinet side panel CSP using the stop element 13 on the lowermost, adjustable drill guide 36 to index the adjustable drill jig 34 relative to the cabinet side panel CSP. It is understood that all ten of the adjustable drill guides 36 have previously been adjusted and fixed in locations along the cross-bar section 35 according to some predetermined plan to locate an uppermost hole for a drawer guide track by using the top or uppermost drill guide 36, the next two succeeding holes are for a door hinge plate using the next succeeding adjustable drill guide 36 and the fixed drill bushing 5 in the upper stem section 3, two sets of three holes for adjustable shelf clips or dowels are provided by the six adjustable drill guides 36 located on the elongated bar 35 between the two stem sections 3, 3 and finally, two lower holes for a second door hinge plate are provided by the fixed drill bushing 5 in the lower stem section 3 and the adjacent adjustable drill guide 36 below the fixed drill bushing 5. After the system of holes has been drilled along the left hand side of the cabinet side panel CSP, the adjustable drill jig 34 is flipped over 180 degrees, indexed and positioned on the right hand edge of the CSP, so that six holes for adjustable shelf clips or dowels can be drilled on the right hand side of the CSP, these six holes would correspond to the six holes drilled on the left hand side of the CSP for the adjustable shelf clips or dowels. Also, the drill bushing 11 in the uppermost adjustable drill guide 36 is utilized for the opposite hole for the drawer track guide on the right hand side of the cabinet side panel CSP. No hinge holes are needed for the right hand side of the CSP and, therefore, each of the two adjustable drill guides 36 adjacent each of the stem sections 3, 3 of the adjustable drill jig 34 are not utilized in this situation. FIG. 13 demonstrates only one particular application of the adjustble drill jig 34 shown in FIG. 11, however, the adjustable drill jig 34 shown in FIG. 11 can be set in a variety of ways to obtain other desired hole patterns: one, two, three, or four drawer base, pull outs behind drawers, etc.

EXAMPLE 6

Figure 14:
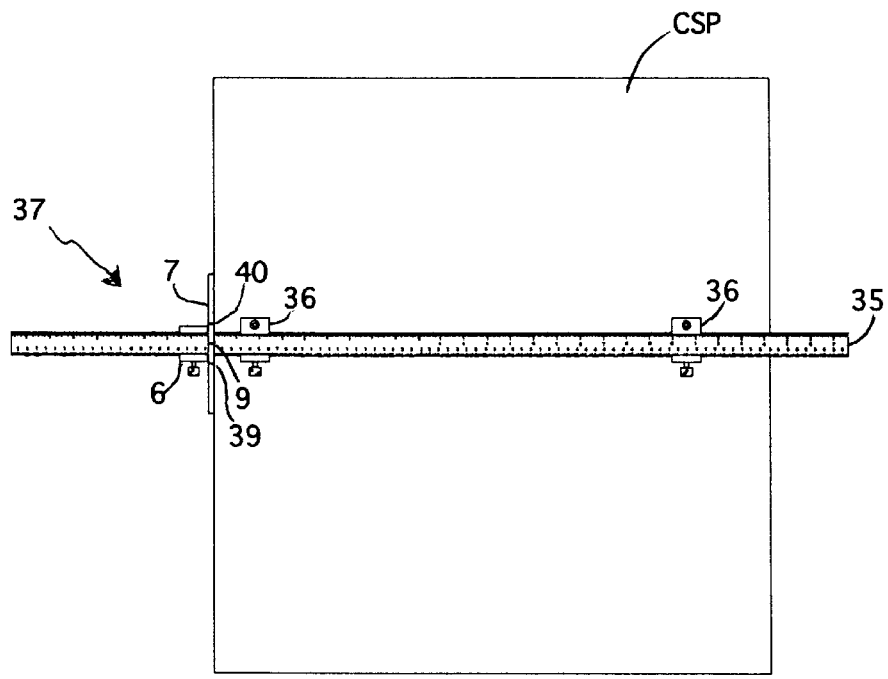
FIG. 14 shows an application of the adjustable drill jig of FIG. 12 to a cabinet side panel.

FIG. 14 shows the adjustable drill jig 37 of FIG. 12 being used on a cabinet side panel CSP to locate and drill two starter holes therein for screws used in the securement of a drawer guide. The adjustable drill jig 37 is positioned a predetermined distance along one edge of the CSP utilizing the stop plate or guide 7 (a measuring tape or ruler would be required in this instance). Each of the two adjustable drill guides 36, 36 have been previously positioned along the elongated bar 35 at predetermined distances from opposite side edges of the CSP where it is desired to drill a pair of spaced holes for hardware used to support a drawer track guide.

Modifications of this invention will be readily apparent to those skilled in the art and it is intended that the invention be not limited by the embodiments disclosed herein but that the scope of the invention be defined by the appended claims.

What is claimed is:

1. An adjustable drill jig for precisely locating and drilling one or more holes in a work piece, said drill jig comprising a T-shaped element having an elongated stem portion and an elongated cross-base portion wherein said stem portion is perpendicular to and attached to said cross-base portion at a mid-point along the length of said cross-base portion, each of said stem and cross-base portions having a surface with at least one rule thereon, a drill bushing located in and at one end of said stem portion and near the attachment of said stem portion to said cross-base portion, at least one movable guide means on said cross-base portion and slidably movable along said cross-base portion, said at least one movable guide means having a drill bushing therein and means for locking or fixing it to said cross-base portion at a desired position thereon, another movable guide means on said stem portion and slidably movable along said stem portion, said another movable guide means having a reference means attached thereto for alinement of said jig to said work piece, said another movable guide means having means for locking or fixing it to said stem portion at a desired position thereon and wherein an imaginary straight line passing through the centers of each of said drill bushings in said at least one movable guide means and in said stem portion is parallel to said elongated cross-base portion.

2. The adjustable drill jig as recited in claim 1 wherein there is one movable guide means on the right hand side of said cross-base portion and one movable guide means on the left hand side of said cross-base portion.

3. The adjustable drill jig as recited in claim 1 wherein there are a plurality of movable guide means on the right hand side of said cross-base portion and a plurality of movable guide means on the left hand side of said cross-base portion.

4. The adjustable drill jig as recited in claim 1 wherein said at least one movable guide means has a stop means attached thereto for alinement of said jig to said work piece.

5. The adjustable drill jig as recited in claim 4 wherein said at least one movable guide means has a means for locking or fixing said stop means into an operative or inoperative position.

6. The adjustable drill jig as recited in claim 4 wherein said stop means is attached to either the right hand side or the left hand side of said at least one movable guide means.

7. The adjustable drill jig as recited in claim 4 wherein said stop means is rotatably movable to engage said work piece for alinement of said drill jig with said work piece.

8. The adjustable drill jig as recited in claim 4 wherein said stop means is substantially rectangular and has an elongated slot therein.

9. The adjustable drill jig as recited in claim 8 wherein said stop means is fixed to said at least one movable guide means by said locking or fixing means and said stop means extends beyond two opposite sides of said at least one one movable guide means to engage said workpiece to the right or left thereof for alinement of said drill jig to said workpiece.

10. The adjustable drill jig as recited in claim 8 wherein said stop means is laterally movable relative to said locking or fixing means and said at least one movable guide means to engage said workpiece for alinement of said drill jig with said workpiece.

11. The adjustable drill jig as recited in claim 8 wherein said stop means is rotatably movable about said locking or fixing means so as to extend beyond said at least one movable guide means to engage said workpiece for alinement of said drill jig with said workpiece.

12. The adjustable drill jig as recited in claim 1 wherein said at least one rule on said stem portion has a zero position mark thereon located near the intersection of said stem and cross-base portions and the center of said drill bushing in said stem portion is alined with said zero position mark.

13. The adjustable drill jig as recited in claim 1 wherein said T-shaped element is made from aluminum or anodized aluminum.

14. The adjustable drill jig as recited in claim 1 wherein said at least one rule on said cross-base portion has a zero position mark thereon located in alinement with the center of said drill bushing on said stem portion.

15. The adjustable drill jig as recited in claim 1 wherein said reference means is a flat shaped element.

16. The adjustable drill jig as recited in claim 1 wherein there are two rules on said surface of said stem portion, one rule in the U.S. system having markings along one longitudinal side of said surface of said stem portion and another rule in the metric system having markings along an opposite longitudinal side of said surface of said stem portion.

17. The adjustable drill jig as recited in claim 16 wherein there are two rules on said surface of said cross-base portion, one rule in the U.S. system having markings along one longitudinal side of said surface of said cross-base portion and another rule in the metric system having markings along an opposite longitudinal side of said surface of said cross-base portion.

18. The adjustable drill jig as recited in claim 1 wherein there are two rules on said surface of said cross-base portion, one rule in the U.S. system having markings along one longitudinal side of said surface of said cross-base portion and another rule in the metric system having markings along an opposite longitudinal side of said surface of said cross-base portion.

19. The adjustable drill jig as recited in claim 1 wherein each of said locking means is a thumb screw.

20. The adjustable drill jig as recited in claim 1 wherein each of said movable guide means has an index or reference mark thereon for positioning each of said movable guide means relative to said at least one rule.

21. The adjustable drill jig as recited in claim 1 wherein the T-shaped element is substantially flat.

22. An adjustable drill jig for precisely locating and drilling one or more holes in a workpiece, said drill jig comprising an elongated base section and two elongated stem sections, each of said stem sections being perpendicular to and attached to said base section near opposite ends of said base section, each of said stem sections and said base section having a surface with at least one rule thereon, a drill bushing located in and at one end of each of said stem sections and near the attachment of each of said stem sections to said base section, a movable guide means on each of said stem sections wherein said movable guide means is slidably movable along each of said respective stem sections, said movable guide means on each of said stem sections having a reference means attached thereto for alinement of said jig to said workpiece, said movable guide means on each of said stem sections having a means for locking or fixing said movable guide means to a respective one of said two stem sections, at least one movable guide means on said base section, said at least one movable guide means on said base section being slidably movable along said base section, each of said at least one movable guide means on said base section having a means for locking or fixing said at least one movable guide means to said base section, each of said at least one movable guide means on said base section having a drill bushing therein and wherein an imaginary line passing through the centers of said drill bushings in said at least one movable guide means and in said two stem sections is parallel to said elongated base section.

23. The adjustable drill jig of claim 22 wherein there is one movable guide means on said base section between one of said two stem sections and one end of said elongated base section and another movable guide means on said base section between the other of said two stem sections and the opposite end of said base section.

24. The adjustable drill jig of claim 23 wherein each of said one movable guide means on said base section and said another movable guide means on said base section has a stop means attached thereto for alinement of said jig to said workpiece.

25. The adjustable drill jig of claim 24 wherein each of said one movable guide means on said base section and said another movable guide means on said base section has a means for locking or fixing said stop means into an operative or inoperative position.

26. The adjustable drill jig of claim 25 wherein said stop means is rotatably movable about said locking or fixing means to engage said workpiece for alinement of said jig with said workpiece.

27. The adjustable drill jig of claim 24 wherein said stop means is substantially rectangular and has an elongated slot therein.

28. The adjustable drill jig as recited in claim 27 wherein said stop means is fixed to said at least one movable guide means by said locking or fixing means and said stop means extends beyond two sides of said at least one movable guide means to engage said workpiece to the right or left thereof for alinement of said drill jig to said workpiece.

29. The adjustable drill jig as recited in claim 27 wherein said stop means is laterally movable relative to said locking or fixing means and said at least one movable guide means to engage said workpiece for alinement of said drill jig with said workpiece.

30. The adjustable drill jig as recited in claim 27 wherein said stop means is rotatably movable about said locking or fixing means so as to extend beyond said at least one movable guide means to engage said workpiece for alinement of said drill jig with said workpiece.

31. The adjustable drill jig as recited in claim 22 wherein said elongated base section is longer than each of said two stem sections.

32. The adjustable drill jig as recited in claim 31 wherein each of said elongated stem sections is of the same length.

33. The adjustable drill jig of claim 23 wherein there is at least one movable guide means on said base section between said two stem sections.

34. The adjustable drill jig of claim 23 wherein there are a plurality of movable guide means on said base section between said two stem sections.

35. The adjustable drill jig as recited in claim 22 wherein said at least one rule on each of said two stem sections has a zero position mark thereon located near the intersection of each of said stem sections and said base section and the center of said drill bushing in each of said stem sections is alined with said zero position mark on each of said stem sections.

36. The adjustable drill jig as recited in claim 22 wherein said two stem sections and said base section are made from aluminum or anodized aluminum.

37. The adjustable drill jig as recited in claim 22 wherein said at least one rule on said base section has a zero position mark thereon located in perpendicular alinement with the center of the drill bushing in the stem section near the left end of said base section.

38. The adjustable drill jig as recited in claim 22 wherein said reference means on each of said movable guide means on each of said two stem sections is a flat shaped element.

39. The adjustable drill jig as recited in claim 22 wherein there are two rules on said surface of each of said stem sections, one rule in the U.S. system having markings along one longitudinal side of said surface of each of said stem sections and another rule in the metric system having markings along an opposite longitudinal side of said surface of each of said stem sections.

40. The adjustable drill jig as recited in claim 39 wherein there are two rules on said surface of said base section, one rule in the U.S. system having markings along one longitudinal side of said surface of said base section and another rule in the metric system having markings along an opposite longitudinal side of said surface of said base section.

41. The adjustable drill jig as recited in claim 22 wherein there are two rules on said surface of said base section, one rule in the U.S. system having markings along one longitudinal side of said surface of said base section and another rule in the metric system having markings along an opposite longitudinal side of said surface of said base section.

42. The adjustable drill jig as recited in claim 22 wherein each of said fixing or locking means is a thumb screw.

43. The adjustable drill jig as recited in claim 22 wherein each of said at least one movable guide means on said base section has an index or reference mark thereon for positioning each of said at least one movable guide means relative to said at least one rule on said base section.

44. The adjustable drill jig as recited in claim 22 wherein said two stem sections and said base section are substantially flat.

45. The adjustable drill jig as recited in claim 23 wherein each of said one movable guide means and said another movable guide means on said base section has a stop means attached thereto for alinement of said jig to said workpiece.

46. The adjustable drill jig as recited in claim 45 wherein said stop means is attached to either the right hand side or the left hand side of each of said one movable guide means and said another movable guide means.

47. An adjustable drill jig for precisely locating and drilling one or more holes in a workpiece, said drill jig comprising an elongated, unitary, substantially flat element having opposite ends and a surface with at least one rule thereon, a movable guide means slidably movable along the length of said elongated element and at least one adjustable guide C-shaped guide means slidably movable along the length of said elongated element, said movable guide means having a stop means and a movable element, said stop means and said movable element being attached to each other, said stop means having a reference means or plane, said at least one adjustable guide means having a drill bushing therein.

48. The adjustable drill jig of claim 47 wherein there are a plurality of movable guide means on said elongated element.

49. The adjustable drill jig as recited in claim 47 wherein said at least one rule on said elongated element has a zero position mark thereon located between opposite ends of said elongated element and near one of said opposite ends.

50. The adjustable drill jig as recited in claim 47 wherein there are two rules on said surface of said elongated element, one rule with spaced markings in U.S. units along one longitudinal side of said surface of said elongated element and another rule with spaced markings in metric units along an opposite longitudinal side of said surface of said elongated element.

51. The adjustable drill jig as recited in claim 47 wherein each of said movable guide means and said at least one adjustable guide means has a means for locking or fixing said movable guide means and said at least one adjustable guide means to said elongated element.

52. The adjustable drill jig as recited in claim 51 wherein each of said fixing or locking means is a thumb screw.

53. The adjustable drill jig as recited in claim 47 wherein said at least one adjustable guide means on said elongated element has an index or reference mark thereon for positioning said at least one adjustable guide means relative to said at least one rule on said elongated element.

54. The adjustable drill jig as recited in claim 47 wherein said elongated element is made from aluminum or anodized aluminum.

* * * * *

UNITED STATES PATENT AND TRADEMARK OFFICE
CERTIFICATE OF CORRECTION

PATENT NO. : 5,807,036
DATED : September 15, 1998
INVENTOR(S) : Tad K. Lostlen

It is certified that error appears in the above-identified patent and that said Letters Patent is hereby corrected as shown below:

Claim 47, line 7: delete "guide" (first occurrence).

Signed and Sealed this

Ninth Day of February, 1999

Attest:

Attesting Officer

*Acting Commissioner of Patents and Trademarks*